United States Patent [19]

Baika et al.

[11] Patent Number: 4,821,686
[45] Date of Patent: Apr. 18, 1989

[54] TWO-STROKE INTERNAL COMBUSTION ENGINE WITH CYLINDER HEAD VALVES

[75] Inventors: Toyokazu Baika, Susono; Norihiko Nakamura, Mishima; Hirosi Noguchi, Gotenba; Tosio Tanahasi; Katsuhiko Hirose, both of Susono, all of Japan

[73] Assignee: Toyota Jidosha Kabushiki Kaisha, Japan

[21] Appl. No.: 155,965

[22] Filed: Feb. 16, 1988

[30] Foreign Application Priority Data

Feb. 18, 1987 [JP] Japan .................................. 62-33445

[51] Int. Cl.$^4$ .............................................. F02B 75/02
[52] U.S. Cl. ............................... 123/65 VD; 123/308; 123/198 F
[58] Field of Search .............. 123/481, 198 F, 65 VD, 123/491, 179 L, 306

[56] References Cited

U.S. PATENT DOCUMENTS

| 2,958,315 | 11/1960 | Williams | 123/65 VC |
|---|---|---|---|
| 3,808,807 | 5/1974 | Lanpheer | 123/65 E |
| 4,162,662 | 7/1979 | Melchoir | 123/65 VD |
| 4,224,905 | 9/1980 | von Seggern et al. | 123/65 WA |
| 4,318,373 | 3/1982 | Soubis | 123/73 R |
| 4,327,676 | 5/1982 | McIntire et al. | 123/90.6 |
| 4,333,428 | 6/1982 | Tanaka et al. | 123/198 F |
| 4,357,917 | 11/1982 | Aoyama | 123/90.16 |
| 4,523,560 | 6/1985 | Motosugi et al. | 123/308 |
| 4,543,928 | 11/1985 | von Seggern | 123/65 VD |
| 4,548,175 | 10/1985 | Kawai et al. | 123/308 |
| 4,580,533 | 4/1986 | Oda et al. | 123/90.16 |
| 4,616,605 | 10/1986 | Kline | 123/65 VD |
| 4,682,576 | 7/1985 | Nakamura et al. | 123/179 A |
| 4,700,681 | 10/1987 | Hanafusa et al. | 123/481 |
| 4,732,116 | 3/1988 | Tanahashi et al. | 123/65 BA |
| 4,732,117 | 3/1988 | Tanahashi et al. | 123/65 PE |
| 4,732,118 | 3/1988 | Tanahashi et al. | 123/65 VD |
| 4,732,124 | 3/1988 | Nakamura et al. | 123/308 |

FOREIGN PATENT DOCUMENTS

| 48-51126 | 7/1973 | Japan . |
|---|---|---|
| 53-27731 | 3/1978 | Japan . |
| 068520 | 4/1984 | Japan . |
| 59-22250 | 7/1984 | Japan . |
| 60-5770 | 2/1985 | Japan . |
| 0164608 | 8/1985 | Japan . |
| 0247006 | 12/1985 | Japan . |
| 61-167129 | 7/1986 | Japan . |
| 61-201818 | 9/1986 | Japan . |

*Primary Examiner*—E. Rollins Cross
*Attorney, Agent, or Firm*—Parkhurst, Oliff & Berridge

[57] ABSTRACT

A two-stroke internal combustion engine comprising a cylinder head 14 having combustion chambers 18 with two intake valves 24 and two exhaust valves 26 arranged therein. Two intake manifolds 30 and 32, respectively, have branch pipes connected to each respective intake port 24. An intake control valve 48 is arranged in one of the manifold 32, which closes at idling and under a low load of the engine. Further, a swirl S is generated about an axis of the combustion chamber 18 by a portion of exhaust gas caused to flow back from the exhaust ports 22 into the combustion chamber 18 after being once exhausted through the exhaust ports when the exhaust valves are opened, resulting in a two layered stratification in the combustion chamber between fresh air and remaining exhaust gas. A supply of fuel causees a further three layered stratification among a fuel mixture, fresh air, and burned gas, by supplying fuel at alternating cycles of the engine when the engine is under a low load.

9 Claims, 5 Drawing Sheets

TWO-STROKE INTERNAL COMBUSTION ENGINE WITH CYLINDER HEAD VALVES

BACKGROUND OF THE INVENTION

1. Field of the Invention

The present invention relates to a two-stroke internal combustion engine in which an intake valve and an exhaust valve are arranged in a cylinder head.

2. Description of the Related Art

Japanese Examined Patent Publication (Kokoku) No. 60-5770 discloses an open-chamber type two-stroke internal combustion engine with an intake valve and an exhaust valve. In this two-stroke engine, the intake valve and the exhaust valve open simultaneously when the piston moves to the bottom dead center, to carry out a scavenging action; namely, fresh air entering the combustion chamber from the intake valve first flows downward along the vertical wall portion of the combustion chamber, and is then deflected by the top of the piston to move upward along the opposite vertical wall portion, to describe a vertical U-shaped course, and accordingly, the location of an interface between the fresh air and exhaust gas is changed, initially near the intake valve, and is moved toward a lower central part of the combustion chamber and near the exhaust valve, and thus exhaust gas is entirely displaced by fresh air in the combustion chamber.

This two-stroke engine may perform well under a high load condition, but suffers from a poor combustion at idling and under a partial load condition. In the two-stroke engine, a small amount of fresh air is supplied at idling and under a partial load so that a large amount of the burnt gas remains in the combustion chamber and is not exhausted, and a small amount of fresh air is spread widely in the unexhausted burned gas and is not collected near the spark plug. This applies in particular to a two-stroke engine having the above stated vertical U-shaped flow, in which a substantial portion of the fresh air may move toward the lower portion of the combustion chamber and stay there. Therefore, the initial burning by the spark plug provided on the cylinder head is hindered and/or the formation of a combustion flame core is prevented. Accordingly, due to the decrease in the speed of transmission of the flame, a misfire or insufficient combustion may occur.

It is conventionally known in the art to generate a swirl about an axis of the combustion chamber. For example, U.S. Pat. No. 4,543,928 discloses a two-stroke engine in which two intake valves are arranged at opposite sides to cause a swirl of intake air about the cylinder axis. An exhaust valve in this engine is arranged in a subcombustion chamber provided centrally at the top of the combustion chamber. In this engine, combustion is initiated at the subcombustion chamber and then spread to the main combustion chamber in which a swirl is generated. This is different from an idea in which a swirl is generated by a back flow of exhaust gas and/or stratification is established between the supplied fresh air and the remaining burned gas in the combustion chamber.

As stated above, conventional two stroke internal combustion engines generally suffer from a problem of a poor combustion at idling and under a low load, since the exhaust action in two stroke internal combustion engines is carried out together with an intake action, to effect a scavenging action, so that a considerable amount of burned gas remains in the combustion chamber and the ratio of supplied fresh air to the remaining burned gas becomes low, and thus the combustion becomes unstable.

The applicant (assignee) for the present invention previously proposed a two-stroke internal combustion engine in which combustion is carried out in a stratified gas between supplied fresh air and remaining burned gas to allow fresh air to collect near the cylinder head at idling and under partial load, by generating a swirl by a portion of the exhaust gas about an axis of the combustion chamber that flows back from the exhaust port into the combustion chamber after being once exhausted through the exhaust valve.

SUMMARY OF THE INVENTION

An object of the present invention is to provide a two-stroke internal combustion engine which can facilitate initial burning and achieve a stable combustion, especially at idling and under a partial load, by establishing, as in a previous case, a stratification between supplied fresh air and remaining burned gas to allow fresh air to collect near the cylinder head, and by further improving the stratification to allow fuel rich air to collect close to the cylinder head.

According to the present invention, there is provided a two-stroke internal combustion engine comprising: a cylinder block and a cylinder head mounted thereon to form a plurality of combustion chambers therein, the cylinder head having at least one intake port and at least one exhaust port formed therein for each of the combustion chambers, with an intake valve and an exhaust valve being arranged in at least one intake port and at least one exhaust port, respectively, for operation in synchronization with the engine to open and close the respective port; a fresh air intake means having an air charging means arranged therein for delivering fresh air under pressure in at least one intake port; means for generating a swirl about an axis of the combustion chamber by a portion of exhaust gas caused to flow back into the combustion chamber from at least one exhaust port after being once exhausted through at least one exhaust port when the exhaust valve opens; and a fuel supply means capable of supplying fuel into the combustion chambers at every cycle of the engine when the engine is under a high load and supplying fuel to the combustion chambers at alternating cycles of the engine when the engine is under a low load.

Preferably, the combustion chambers are divided into two groups so that each respective group consists of combustion chambers having an alternating spark order and at least fuel injector is arranged at every combustion chamber, fuel injection being carried out only from fuel injectors of one of the two groups at a certain cycle of the engine and only from fuel injectors of the other group at the next cycle.

With this arrangement, a stratification between fresh air and remaining burned gas can be established, at least at idling and under a partial load, as follows.

The exhaust valve opens while the piston is moving downward and the burned gas is blown down from the combustion chamber into the exhaust port. The blow down pressure at idling or under a partial load may be relatively low, but a positive pressure prevails in the exhaust port. The blow down period is short, but the piston still continues to move downward, causing a reduction in the pressure in the combustion chamber. When the pressure in the combustion chamber becomes lower than that in the exhaust port, a back flow or reverse flow occurs of a portion of the exhaust gas that was once exhausted or blown down when the exhaust valve was opened.

The means for generating a swirl about an axis of the combustion chamber according to the present invention acts on this exhaust gas back flow to cause a swirl in the exhaust gas in the combustion chamber. Thereafter, the intake valve opens and fresh air flows into the combustion chamber relatively slowly, since a relatively small amount of fresh air is supplied at idling or under a partial load, and this slow flow of fresh air is superimposed on the swirling exhaust gas and collected near the cylinder head.

This is the first phase of a stratification between the fresh air and the remaining burned gas, in which fresh air is collected near the cylinder head superimposed on the swirling exhaust gas which exists on the piston side. If fuel was included in the fresh air by this phase, a relatively rich mixture would be collected near the spark plug due to the stratification and, therefore, an initial burning and stable combustion can be facilitated. However, at the interface region between the fresh air and the remaining burned gas, the mixture will be further mixed with the remaining burned gas to cause a shortage of oxygen and pollution by unburned fuel.

According to the present invention, fuel is supplied at alternating cycles of the engine when the engine is under a relatively low load. For a particular combustion chamber at a certain cycle, fuel is not supplied by the first phase of a stratification, and thus the cycle will be completed without a combustion and with the stratification maintained. A stratification will be similarly established at the next cycle and fuel will be supplied in this cycle. Therefore, a new layer of fresh air, containing fuel, is superimposed on the layer of previously stratified fresh air and remaining burned gas. Therefore, a three stage stratification is established; a mixture layer, a fresh air layer, and a remaining burned gas layer, viewed from the spark plug. This mixture can be easily ignited. At this second phase of a stratification, the mixture is superimposed on fresh air so that a lack of oxygen cannot occur and a good combustion will be obtained.

BRIEF DESCRIPTION OF THE DRAWINGS

The present invention will become more apparent from the following description of the preferred embodiment with reference to the accompanying drawings, in which.

DESCRIPTION OF THE PREFERRED EMBODIMENTS

Figure 1:
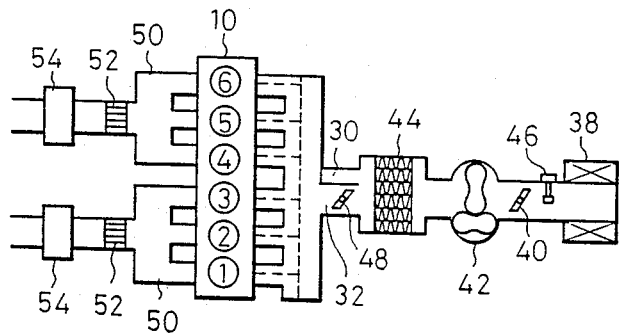
FIG. 1 is a diagrammatic view of a two-stroke internal combustion engine having six cylinders according to the present invention.
Figure 2:
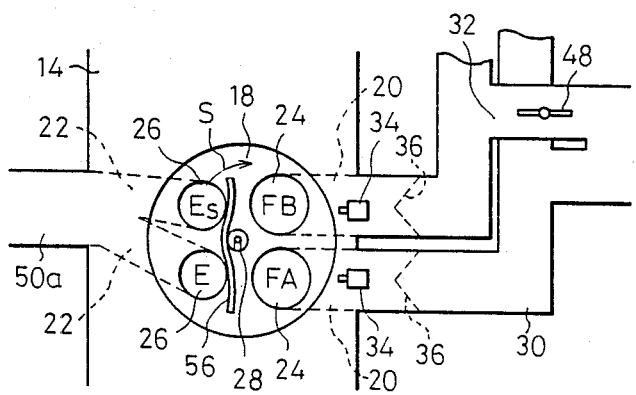
FIG. 2 is a view showing in more detail one of the cylinders in FIG. 1, and more specifically, showing an arrangement of the combustion chamber.
Figure 3:
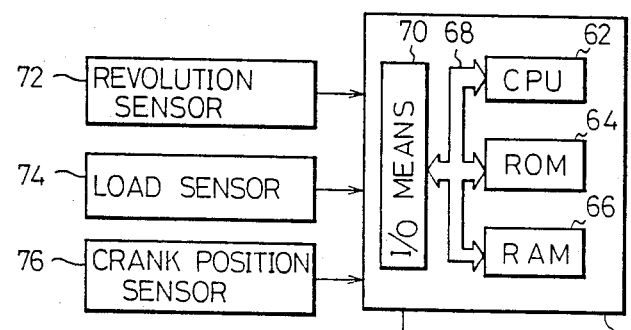
FIG. 3 is a vertical section view of the cylinder of FIG. 2.
Figure 3:
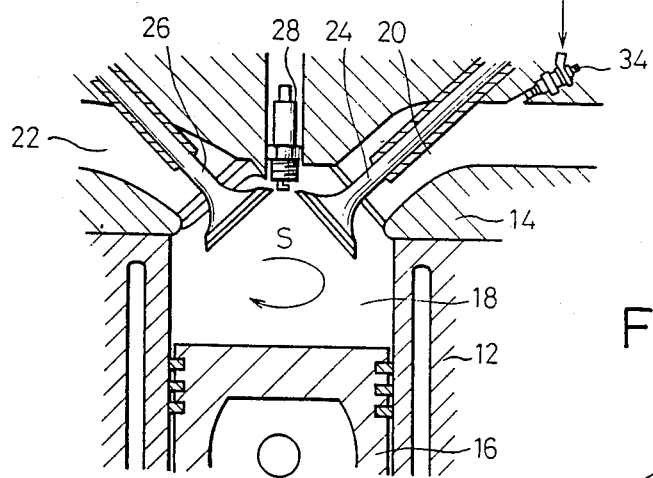

Referring to FIGS. 1 to 3, the two-stroke internal combustion engine according to the present invention comprises an engine body 10, as represented in FIG. 1, which comprises, as represented in FIG. 3, a cylinder block 12 having a cylinder bore and a cylinder head 14, and a piston 16 reciprocably arranged in the cylinder bore. A combustion chamber 18 is formed above the piston 16. Fresh air intake ports 20 and exhaust ports 22 are provided at the cylinder head 14 in an opposed relationship, and intake valves 24 and exhaust valves 26 are arranged therein, respectively. Each of the intake valves 24 and exhaust valves 26 is constructed by a conventional poppet valve.

As shown in FIG. 2, the intake valves 24 and exhaust valves 26 are provided two by two, and a spark plug 28 is mounted centrally in the combustion chamber 18. Note, the two exhaust valves 26 are given the symbols E and Es and the intake valves 24 are given the symbols FA and FB. This means that the intake valves 24 have different functions. Namely, one of the intake valves 24, given the symbol FA, is hereinafter referred to as a first or low load intake valve, and the other intake valve 20, given the symbol FB, is referred to as a second or high load intake valve. Also, one of the exhaust valves 26, given the symbol Es and opposing the second high load intake valve 24 (FB), is hereinafter referred to as a first exhaust valve, and the other exhaust valve 26, given the symbol E, is referred to as a second exhaust valve.

As shown in FIGS. 1 and 2, two intake manifolds 30 and 32 are mounted to the cylinder head 14. The intake manifold 30 is provided with branch pipes connected to the intake port 20 having the first low load intake valve 24 (FA), and the other intake manifold 32 is provided with branch pipes connected to the intake port 20 having the second high intake valve 24 (FB). The two intake ports 20 extend perpendicular to the longitudinal axis of the engine and parallel to each other on either side of the transverse center line of the engine, at least the intake port 20 having the first low load intake valve 24 (FA) opening tangentially in the combustion chamber 18. Fuel injectors 34 are arranged in each of the intake ports 20 or in each of the branch pipes of the intake manifolds 30 and 32. Further, check valves 36, which are reed valves, are arranged upstream of the fuel injectors 34, respectively.

As shown in FIG. 1, an air cleaner 38 is provided at the upstream end of the fresh air passage to introduce fresh air, and a throttle valve 40 is provided for a manual control of the flow of intake fresh air. A supercharger (S/C) 42 is provided on the downstream side of the throttle valve 40 to deliver fresh air under pressure. An inter cooler 44 is provided on the downstream side of the supercharger 42 to cool the intake fresh air and the above stated two intake manifolds 30 and 32 are commonly connected to this inter cooler 44. The supercharger 42 can be a mechanical displacement pump, preferably a Roots type blower, mechanically driven by the output of the engine. Further, an air flow meter 46 is arranged upstream of the throttle valve 40.

A butterfly type intake control valve 48 is arranged in the collecting portion of the high load intake manifold 32. In contrast to the intake and exhaust valves 24 and 26, which are operated in synchronization with the crankshaft (not shown) of the engine, this intake control valve 48 is operated in response to the running condition of the engine, such as the load and the revolutional speed of the engine. The intake control valve 48 is closed at least when the engine is idling or when the load of the engine is relatively low, so that fresh air passes only through the low load intake manifold 30. The intake control valve 48 is opened to allow a large amount of fresh air to pass through both intake manifolds 30 and 32 when the load of the engine is relatively high.

As shown in FIG. 1, two exhaust manifolds 50 are provided for six cylinders, the first exhaust manifold 50 being connected to the number one, two, and three cylinders and the second exhaust manifold 50 being connected to the number four, five, and six cylinders. Each of the exhaust manifolds 50 has at the collecting portion thereof a catalyser 52 and terminates at a muffler 54. In this example, the ignition is carried out in the following order: one, six, two, four, three, and five (1, 6, 2, 4, 3, 5) cylinders. Each of the exhaust manifolds 50 has three branch pipes, one of which is connected to the exhaust port 22 of one cylinder, respectively.

FIG. 2 shows one such exhaust branch pipe 50a, which is mounted on the cylinder head 14 perpendicular to the longitudinal axis thereof. Note, there are two exhaust ports 22 for one cylinder and the second exhaust port 22, having the exhaust valve 26 (E), merging into the first exhaust port 22, having the exhaust valve 26 (Es) within the cylinder head 14 at a predetermined angle. The first exhaust port 22, having the exhaust valve 26 (Es) is shaped to extend perpendicular to the longitudinal axis of the engine, so that it is connected to the exhaust branch pipe 50a in a generally linear relationship and is opened tangentially in the combustion chamber 18. This arrangement of the exhaust ports 22 enables an increase in the velocity of exhaust gas from the combustion chamber by the provision of the two exhaust valves 26 and allows a portion of exhaust gas to generate a swirl S around the axis of the cylinder; the burned gas is exhausted from the combustion chamber 18 into the exhaust ports 22 and exhaust manifold 50 and then a portion of the once exhausted gas flows back into the combustion chamber 18, mainly straight from the exhaust branch pipe 50a through the first exhaust port 22 having the exhaust valve 26 (Es), due to the effect of inertia, with less flow through the angled second exhaust port 22.

This swirl S is generated in the clockwise direction in FIG. 2. The first exhaust port 22 having the exhaust valve 26 (Es) and adapted to generate the swirl S, is opposed to the intake port 20 having the second high load valve 20 (FB) in a generally linear relationship, and to the intake port 20 having the first low load valve 20 (FA) in an offset relationship relative to the transverse center line. Therefore, a swirl may be generated by intake fresh air when fresh air is introduced through the intake port 20 having the first low load valve 20 (FA) into the combustion chamber 18 under a low load, and this fresh air swirl is generated in the same clockwise direction as that of the exhaust swirl S. Under a low load, the intake control valve 48 is closed so that no air flows through the intake port 20 having the second high load valve 20 (FB), and thus cannot interfere with the exhaust swirl S. Therefore, the exhaust swirl S together with the fresh air swirl can not disappear and is maintained.

As shown in FIG. 2, a mask 56 is provided in the inner wall of the cylinder head 14, or the upper wall of the combustion chamber 18. The mask 56 is formed by a ridge-like projection on the wall of the cylinder head 14, which transverses centrally in the combustion chamber between the intake valves 24 and the exhaust valves 26 in parallel to the longitudinal axis of the engine, and comprises a majority of diametrically central rise portions and diametrically outer gentle slope portions. The spark plug 28 is on the side of the intake valves 24 from the mask 56. This mask 56 also aids the formation of the swirl S under a low load. Namely, although there is less back flow through the exhaust valve 26 (E), as described above, a back flow, if it exists, may be obstructed by the mask 56. The back flow through the exhaust valve 26 (Es) will swirl in the combustion chamber by itself, and a portion thereof which is deflected from the tangential swirl course toward the center of the combustion chamber 18 may also be obstructed by the mask 56. Therefore, the back flow through the exhaust valve 26 (Es) is forced to pass along the diametrically outer gentle slope portions of the mask 56 to increase the tendency to flow along the inner cylindrical surface of the combustion chamber 18 and the cylinder bore. Further, under a high load, fresh air is supplied through both parallel extending intake ports 20 and collides at the mask 56 to be turned to a downward course, thereby preventing the fresh air from being directly blown off from the exhaust ports 22. Also, the spark plug 28, on the side of the intake valves 24, can be placed in contact with a richer mixture.

Now, the action of the exhaust or burned gas is summarized. The burned gas is blown down from the combustion chamber 18 into the exhaust ports 22 just after the exhaust valves 26 open. The blow down pressure at idling or under a partial load may be relatively low, but a positive pressure prevails in the exhaust ports 22 and the pressure in the combustion chamber 18 is suddenly decreased. The pressure in the combustion chamber 18 then becomes lower than that in the exhaust ports 26 during the downward movement of the piston 16, so that a portion of the exhaust gas that has been once exhausted or blown down is made to flow back into the combustion chamber 18, due to this pressure difference.

In this way, a back flow of once exhausted gas into the combustion chamber 18 occurs just after the relatively weak exhaust blow down. According to the present invention, this back flow of exhaust gas into the combustion chamber 18 generates a swirl S in the combustion chamber 18 about the axis of the cylinder, as represented by the mark S in FIGS. 2 and 3. Note, although there are many proposals in the art to generate a swirl of the intake air flowing through the intake port, fundamental features of the present invention is to generate a swirl in the back flow of the exhaust gas.

Figure 4:
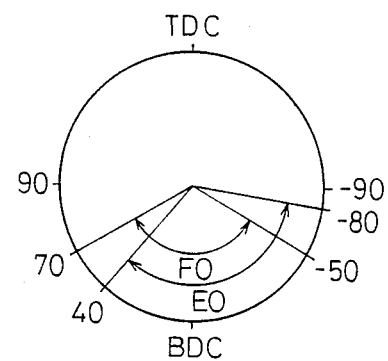
FIG. 4 shows the valve operation timings.
Figure 6A:
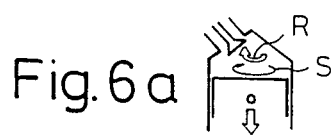
FIGS. 6a to 6e are explanatory views of the second phase of the stratification at the next cycle when fuel is supplied.

FIG. 4 shows the operating timing of the intake valves 24 and the exhaust valves 26, driven in synchronization with the crankshaft of the engine. The opening time of the intake valves 24 is represented by the symbol F0 and the opening time of the exhaust valves 26 is represented by the symbol E0. As is known in the art, the two-stroke engine effects only two strokes, namely, an expansion stroke in which the piston 16 moves downward from the top dead center (TDC) to the bottom dead center (BDC) and a compression stroke in which the piston 16 moves upward from the bottom dead center (BDC) to the top dead center (TDC). The intake and the exhaust operations are carried out near the bottom dead center (BDC) of these two strokes, and inherently includes a scavenging action in which fresh air forcibly supplied under pressure by the supercharger 42 replaces the burned gas in the combustion chamber 18. There is little problem in achieving a combustion in such a two-stroke engine under a high load, since a large amount of fresh air is supplied to the combustion chamber 18 together with a correspondingly large amount of fuel, with a result that less burned gas remains in the combustion chamber 18. However, as discussed previously, the supply of fresh air and fuel is reduced at idling and under a low load, and a large amount of burned gas remains in the combustion chamber 18, and thus combustion must be realized in the presence of such a large amount of remaining burned gas. The supplied fresh air and fuel will be made leaner by mixing with this large amount of remaining burned gas, resulting in difficulty in realizing the initial burning.

According to the present invention, as exemplified in FIG. 4, the exhaust valves 26 open at 80 degrees before the bottom dead center (BDC), where the piston 16 is moving downward fast, accompanying the decrease in the pressure in the combustion chamber 18 after a relatively weak blow down at idling or under a low load, thereby causing a positive back flow of exhaust gas due to the back pressure in the exhaust port 22 and the negative pressure in the combustion chamber 18. The exhaust valves 26 close at 40 degrees after the bottom dead center (BDC). The intake valves 24 open at a point after the opening of the exhaust valves 26 such that the back flow of the exhaust gas always occurs, for example, at 60 degrees before the bottom dead center (BDC), and close at 60 degrees after the bottom dead center (BDC) after the exhaust valves 26 are closed.

FIG. 5 is an explanatory view of the generation of a swirl in the back flow of exhaust gas, and the flow of fresh air stratified over the swirling and remaining exhaust gas, at idling and under a low load. In these conditions, the intake control valve 48 is closed and fresh air flows only through the low load intake valve 24 (FA). This fresh air flow is relatively slow and moderate, since the supply of fresh air is small in volume and the charging pressure by the supercharger 42 is low. As shown in FIG. 5a, the exhaust valves 26 open at 80 degrees before the bottom dead center (BDC), and exhaust gas is blown down relatively weakly at the pressure P. This blow down terminates after a short time at idling and under a low load. The pressure P in the exhaust ports 26, for example, instantaneously reaches 2 to 3 kilograms per square centimeter during the exhaust blow down, and decreases to 1.05 kilograms per square centimeter. Thereafter, this pressure level is stably maintained in the exhaust ports 26 to apply a positive back pressure toward the combustion chamber 18.

Figure 5A:
FIGS. 5a to 5e are explanatory views of the first phase of a stratification of fresh air and remaining burned gas under a low load at a cycle when fuel is not supplied.
Figure 5B:
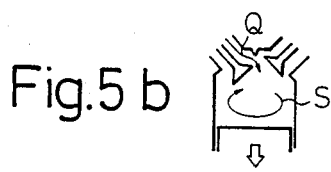
Figure 6B:
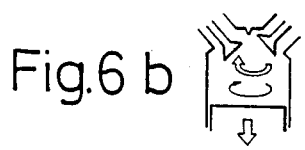

As shown in FIG. 5b, the pressure in the combustion chamber 18 becomes negative as the piston 16 continues to move downward and exhaust gas flows back from the exhaust ports 22 into the combustion chamber 18, as shown by the arrow Q. This back flow of exhaust gas generates a swirl S in the combustion chamber 18 due to the provision of the swirl generating means, specifically comprising the disposition of the intake ports 20 and the exhaust pots 22 and the mask 56. The low load intake valve 24 (FA) will open at 60 degrees before the bottom dead center (BDC). The flow of fresh air is regulated by the throttle valve 40 and delivered under pressure by the supercharger 42, the pressure level being relatively low at idling and under a low load. Further, a certain short time will pass from the start of the opening of the intake valve 24 to the actual full opening thereof, and thus the intake of fresh air is delayed to a certain degree and the back flow of and formation of the swirl of the exhaust gas will continuously occur even during the initial phase of opening of the intake valve 24. In this way, this exhaust gas swirl may continue for a fairly long time about the axis of the cylinder, or the combustion chamber 18, and be maintained by the last phase of the compression stroke without a substantial decrease therein.

Figure 5C:
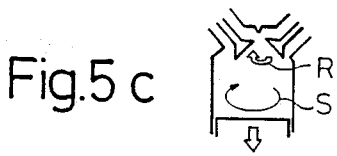
Figure 6C:
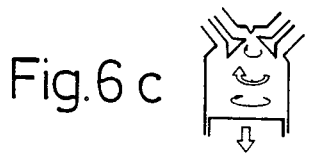
Figure 5D:
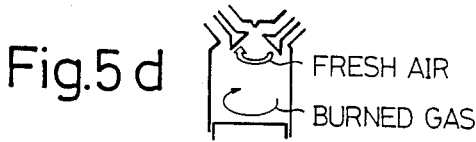

Thereafter, fresh air will enter the combustion chamber 18 when the intake valve 24 is opened, as shown in FIGS. 5c and 5d. This fresh air flows slowly around the intake valve 24 under a relatively low charging pressure, as previously described, and the speed of the downward movement of the piston 16 becomes reduced at this state, near the BDC, and thus the formation of a negative pressure in the combustion chamber 18 will be mitigated. Therefore, fresh air enters the combustion chamber 18 slowly and moderately and settles quietly over the swirling exhaust gas, without a downward penetration into the exhaust gas. Rather, the flow of fresh air will form a swirl R, swirling together with the exhaust swirl S thereover and stratified therebetween. In this way, fresh air collects at the upper part of the combustion chamber 18 near the cylinder head 14 with the spark plug 28, and thus stratification is achieved between fresh air and exhaust gas, with fresh air near the cylinder head 14 and exhaust gas near the piston 14.

Figure 5E:
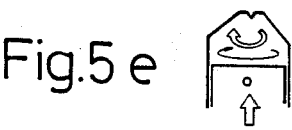
Figure 6E:
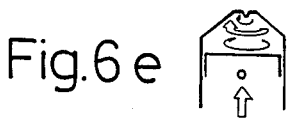

This stratification between fresh air and exhaust gas is maintained, as shown in FIG. 5e, even after the piston 16 moves to the BDC and then moves upward and the exhaust valve 26 is closed, and finally, the intake valve 24 is closed. Also, the speed of the piston 16 is relatively low for a short while after the piston 16 turns to the upward movement beyond the bottom dead center (BDC) and the catalysers 52 in the exhaust manifolds 50 prevent a decrease in the pressure in the exhaust ports 22 and the exhaust manifolds 50, so that a flowout, or blow-by, of fresh air from the combustion chamber 18 to the exhaust ports 22 is obstructed. Also, the catalyser 52 in the exhaust manifolds 50 is known to be able to reflect a pressure wave during an exhaust blow down, the reflected pressure wave applying a back pressure to the combustion chamber 18 after the piston 16 turns to the upward movement beyond the bottom dead center (BDC), to prevent a flow out, or blow-by, of fresh air from the combustion chamber 18 to the exhaust ports 22. To ensure this effect, it is necessary to eliminate any overlap of the opening timing of the exhaust valves 26, this being achieved by providing two exhaust manifolds 50 with the catalysers 52, respectively, as shown in FIG. 1.

The supply of fuel is now described.

As shown in FIG. 3, opening and closing timings are controlled by an electronic control unit 60. The control unit 60 comprises a microcomputer, including a central processing unit (CPU) 62 having arithmetic and control functions, a read only memory (ROM) 64 having a program stored therein and a random access memory (RAM) 66 for storing data or the like. A bus 68 interconnects these elements and an input and output (I/0) interface means 70. The control unit 60 receives signals from several sensors representing the operating conditions of the engine and necessary for the control of the fuel injection. Typically, a revolution sensor 72, a load sensor 74, and a crank position sensor 76 are important, according to the present invention. These sensors and other sensors are widely used in many conventional fuel injection systems, and thus a detailed description thereof is omitted here.

Figure 7:
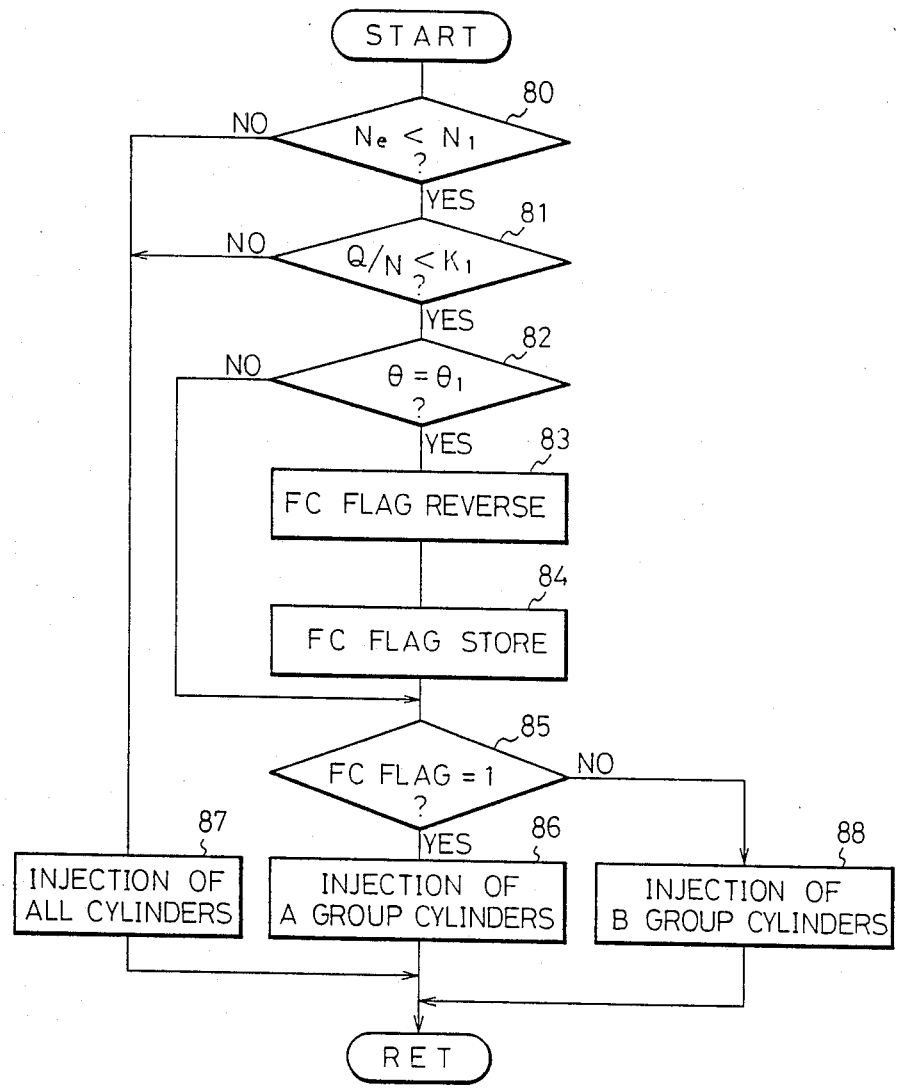
FIG. 7 is a flow chart for controlling a fuel injection and injecting fuel at alternating cycles under a low load.

FIG. 7 is a flow chart of a fuel injection control, showing only a main flow necessary for executing the present invention. At step 80, it is determined whether the detected revolution of the engine (Ne) is lower than a predetermined value ($N_1$). If the result is NO, namely, when the detected revolution of the engine (Ne) is higher than the predetermined value ($N_1$), the program goes to step 87 to execute a fuel injection at all cylinders. If the result is YES at step 80, the program goes to step 81 at which it is determined whether the detected load of the engine represented by a volume of intake air per revolution (Q/N) is lower than a predetermined value ($K_1$). If the result is NO, namely, when the detected load of the engine (Ne) is higher than the predetermined value ($K_1$), the program also goes to step 87 to execute a fuel injection at all cylinders. If the result is YES at step 81, the program goes to step 82. At step 82 it is determined whether the operation of the engine has advanced by one cycle, for example, by determining whether the crank position of a particular cylinder has reached a predetermined value ($\theta_1 = 360$ angles). If the result is YES at step 82, the one cycle advance is ensured and the program goes to step 83 to cause an FC flag to be reversed, and then goes to step 84 to store that FC flag. The program further goes to step 85. If the result is NO at step 82, it is judged that the engine has not advanced by one cycle and the program goes directly to step 85.

Figure 8:
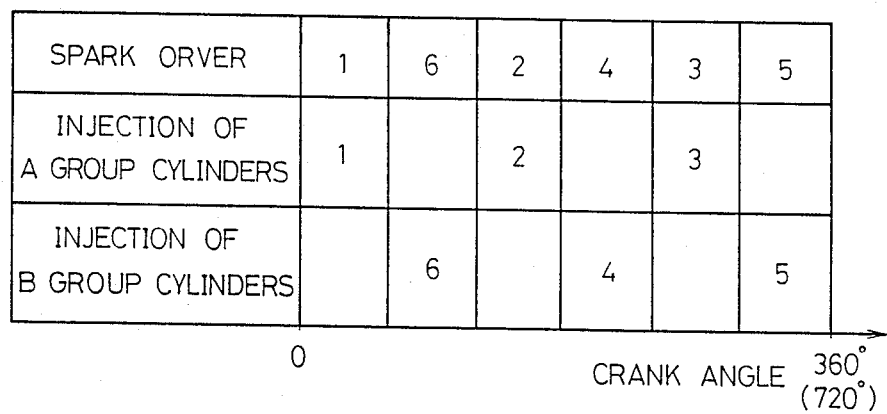
FIG. 8 is a view for explaining fuel injections at alternating cycles by dividing the combustion chambers into two groups.

The six cylinders, as shown in FIG. 1, are divided into two groups, as shown in FIG. 8; the A group consisting of the number one, two, and three cylinders and the B group consisting of the number four, five and six cylinders. An injection at all cylinders at step 87, after passing through steps 80 and 81, means that the fuel injectors 34 of all cylinders are opened in accordance with the predetermined firing order of the cylinders at a respective fuel injection timing. The fuel injection timing can be appropriately set, for example, at a point before the closing point of the intake valve 24 in FIG. 4.

The flow chart in FIG. 7 includes the execution of a fuel injection at the A group of cylinders (step 86) and a fuel injection at the B group of cylinders (step 88). When a fuel injection at the group cylinders is to be executed, fuel is injected by the fuel injectors 34 only at the cylinders of the selected group and at the respective fuel injection timing, as shown in FIG. 8. For example, when the A group is selected, a fuel injection at the number one, two and three cylinders is carried out but a fuel injection at the number four, five and six cylinders is not carried out, at the respective fuel injection timing. This fuel injection at the group of cylinders is carried out at alternating cycles of the engine. Regarding a particular cylinder, fuel injection is carried out at a certain cycle of the engine and not carried out at the next cycle, which is repeated alternately.

Referring to FIG. 7, steps 82, 83 and 84 cause the FC flag, which appoints the group to be injected, to be reversed at alternating cycles under a low load, and step 85, 86 and 88 selects one of the A and B groups in accordance with the FC flag.

Figure 6D:
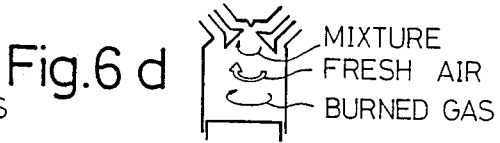

FIG. 5 shows the operation of one of the cylinders under a low load at a cycle in which a fuel injection is not carried out, but a stratification between fresh air and remaining burned gas is established, as previously described. However, ignition and combustion do not occur at the spark timing since fuel is not supplied at this cycle, and therefore, the operation advances to the next cycle with the stratification maintained. FIG. 6 shows the operation of this next cycle. At FIG. 6a, corresponding to FIG. 5a, a blow down of exhaust gas does not occur since there is no combustion in the previous cycle, so that the piston 16 moves downward, maintaining the stratification between fresh air and remaining burned gas. Also, there is no back flow of once exhausted gas at FIG. 6b. Fresh air is introduced when the intake valve 24 is opened at FIG. 6c. In this case, similar to the previous cycle, new fresh air is stratified over the previously stratified layers of fresh air and the remaining burned gas. It is possible for a stratification having three layers to be established. Fuel is supplied at this cycle while the intake valve 24 is opened and the uppermost layer is a layer of a mixture of fresh air and fuel, as shown in FIG. 6d.

Accordingly, the mixture collects in the cylinder head 14 near the spark plug 28, without dispersal, to make the air fuel ratio leaner near the spark plug 28. Therefore, it is possible to achieve a stable combustion because of an easy ignition of the mixture by the spark plug 28. Further, the mixture is superimposed on the burned gas through the layer of fresh air and is activated by heat to become thermally activated with radical fuel components, to attain a combustion with an increased ignitability. Note, the layer of fresh air under the mixture ensures a complete combustion without a lack of oxygen even if a large amount of the remaining burned gas is present, and less unburned fuel is polluted. This can provide a good fuel economy and less exhaust pollution.

When the engine is under a relatively high load, the intake control valve 48 opens to enable fresh air to flow through both intake ports 20, especially, a large amount of fresh air can pass through the high load intake port 20. Therefore, a large amount of fresh air is introduced, with a result that the effect of the swirl S will be reduced in this case and a transversing scavenging action takes place. In this case, the mask 56 transversing centrally on the cylinder head 14 works so that intake fresh air may transversely flow toward the exhaust ports 22 but collapses at the mask 56 to flow downward to thereby realize a U-shaped scavenging action in which the fresh air flows downward and is deflected by the top of the piston 16 to an upward flow. In this case, a fuel injection at all cylinders at every cycle is carried out, and thus a high torque, which is proper to the two stroke internal combustion engine, can be obtained.

As has been made clear, it is possible, according to the present invention, to establish a stratification between fresh air and remaining exhaust gas and ensure that the mixture does not come into direct contact with the remaining burned gas, to effect a stable combustion with less pollution when idling or under a low load.

We claim:

1. A two-stroke internal combustion engine comprising:
   a cylinder block and a cylinder head mounted thereon to form a plurality of combustion chambers therein, the cylinder head having at least one intake port and at least one exhaust port formed therein for each of said combustion chambers, an intake valve and an exhaust valve being arranged in said at least one intake port and said at least one exhaust port, respectively, and operating in synchronization with the engine to open and close the respective port;

a fresh air intake means having an air charging means arranged therein for delivering fresh air under pressure in said at least one intake port;

means for generating a swirl about an axis of said combustion chamber by a portion of exhaust gas caused to flow back from said at least one exhaust port into said combustion chamber after being once exhausted through said at least one exhaust port when said exhaust valve opens; and a fuel supply means capable of supplying fuel into said combustion chamber at every cycle of the engine when the engine is under a high load and supplying fuel into said combustion chambers at alternating cycles of the engine when the engine is under a low load.

2. An engine according to claim 1, wherein said combustion chambers are divided into two groups so that each respective group consists of combustion chambers having an alternating firing order and said fuel supply means comprises at least one fuel injector arranged for every combustion chamber, fuel injection being carried out only from fuel injectors of one of the two groups at a certain cycle of the engine and then only from fuel injectors of the other group at the next cycle.

3. An engine according to claim 2, wherein said at least one intake port comprises first and second intake ports extending from one side of the engine in a side by side relationship and said at least one exhaust port comprises first and second exhaust ports extending from the opposite side of the engine.

4. An engine according to claim 3, wherein said cylinder head has a ridge-shaped mask wall which extends transversely of the combustion engine between the intake valve and the exhaust valve, said mask wall comprising a central rise portion near the center of the combustion chamber and outer sloped portions on either side of the central rise portion near the periphery of the combustion chamber so as to generate said swirl in said combustion chamber along the periphery thereof when said portion of exhaust gas flows back into said combustion chamber.

5. An engine according to claim 3, wherein said first exhaust port extends opposite to said second intake port and said second exhaust port extends opposite to said first intake port, said second exhaust port merging with said first exhaust port at a predetermined angle.

6. An engine according to claim 5, wherein a first and a second intake manifolds are provided, said first intake manifold having a set of intake branch pipes for connection to said first intake ports of all combustion chambers and said second intake manifold having a set of intake branch pipes for connection to said second intake ports of all combustion chambers, said first and second intake manifolds being connected to a common upstream intake pipe.

7. An engine according to claim 6, wherein an intake control valve is arranged in one of said first and second intake manifolds for operation in response to a load of the engine and closing said when the load of the engine is lower than a predetermined value and opening when the load is higher than said predetermined value.

8. An engine according to claim 7, wherein said first exhaust port is connected to an exhaust branch pipe in a generally linear relationship with said second exhaust port extending at a predetermined angle, whereby said portion of exhaust gas caused to flow back into said combustion chamber when said exhaust valve is open, primarily flows through said first exhaust port by inertia and generates said swirl in said combustion chamber, and a counter flow from said second intake port is obstructed by said intake control valve when the load of the engine is lower than said predetermined value.

9. An engine according to claim 8, wherein a first and a second exhaust manifolds are provided, each of said first and second exhaust manifolds having a set of exhaust branch pipes connected to said first exhaust ports of the combustion chambers having an alternating firing order, respectively.

* * * * *